United States Patent [19]

Sloane

[11] 3,884,760

[45] May 20, 1975

[54] PRODUCTION OF UROKINASE

[76] Inventor: Nathan H. Sloane, 1842 Brookside Dr., Germantown, Tenn. 38038

[22] Filed: Apr. 1, 1974

[21] Appl. No.: 456,553

[52] U.S. Cl.............................................. 195/66 B
[51] Int. Cl............................................ C07g 7/026
[58] Field of Search .................................. 195/66 B

[56] References Cited
UNITED STATES PATENTS 3,650,903  3/1972  Sloane............................... 195/66 B
3,755,083  8/1973  Novak................................ 195/66 B Primary Examiner—Lionel M. Shapiro

[57] ABSTRACT

Uric acid in suspension is used to absorb urokinase from a liquid and said urokinase is subsequently eluted from the uric acid suspension. The urokinase concentrate after elution from the uric acid can be further purified by methods described by Sloane in U.S. Pat. Nos. 3,477,910, 3,477,911, 3,477,912 and 3,477,913 patented on Nov. 11, 1969.

4 Claims, No Drawings

PRODUCTION OF UROKINASE

BACKGROUND OF THE INVENTION

1. Field of the Invention

The invention relates to a method for the purification of urokinase from liquids that contain this thrombolytic enzyme. The enzyme, urokinase, is adsorbed onto uric acid in suspension in the liquid. The uric acid containing the adsorbed urokinase is removed by centrifugation and washed free of salts and contaminating proteins. Elution of the urokinase is accomplished by placing the suspension of washed uric acid containing the adsorbed urokinase in a dialysis bag and dialyzing against a weakly alkaline solution in the cold. The uric acid will go into solution and dialyze into the dialyzing medium, leaving purified urokinase in solution inside the dialysis bag.

2. Description of the Prior Art

Urokinase, a substance found in mamalian urine, is of great importance in the treatment of certain blood disorders, such as those which tend to cause the formation of blood clots in the cardiovascular system. Persons afflicted with such disorders must be treated for this condition before thrombosis occurs and such treatment frequently involves the administration of urokinase which dissolves blood clots and prevents the further formation of clots.

Urokinase is an enzyme cofactor which stimulates the production of the clot-dissolving proteolytic enzyme, plasmin, in the blood. Bacterial filtrates, such as staphylokinase and streptokinase, also have the ability to promote the formation of plasmin. The great quantities of urine which are available as a cource of urokinase, however, make a method which utilizes this source economically desirable. The large volume of urine required to obtain sufficient amounts of urokinase require a method wherein sufficient amounts of urokinase require a method wherein a urokinase-rich fraction of comparatively small unit volume can be quickly and efficiently isolated from the urine.

Heretofore, urokinase has been obtained from urine by its absorption on benzoic acid as disclosed in U.S. Pat. No. 2,989,440, patented June 20, 1961. Benzoic acid does not combine chemically with urokinase, but rather, the urokinase is absorbed on the benzoic acid and, as a result, necessitates a number of combersome and inefficient steps for its purification. The process disclosed in the foregoing patent is, therefore, not entirely satisfactory for those reasons.

The use of tannic acid, tannic acid-nucleoprotein complex and inactivated proteins in the purification of urokinase from human urine has been disclosed in U.S. Pat. Nos. 3,477,910, 3,477,911, 3,477,912 and 3,477,913 patented on Nov. 11, 1969.

The use of bentonite or aluminum silicate for the absorption of urokinase from human urine and its elution by weak acid (pH1.5—3) or aqueous 6,9-diamino-2-ethoxyacridine has been disclosed in U.S. Pat. No. 3,355,361 and British Pat. No. 1,068,917, May 17, 1967. Although the above patents yield urokinase concentrates, the present procedure described herein is very useful because simple absorption and elution produces highly active urokinase concentrates in essentially quantitative yields that can be used for further purification.

SUMMARY OF THE INVENTION

The present invention is based on the discovery that urokinase can be efficiently adsorbed from solution by uric acid (in suspension in said liquid). The adsorption of urokinase from the fluid is essentially quantitative. Elution is accomplished by dialyzing the washed suspension of uric acid containing the adsorbed urokinase against a weakly alkaline buffer solution in the cold. The uric acid dissolves and dialyzes into the dialyzing solution and leave highly purified urokinase in solution in the dialysis bag. The yield of urokinase is essentially quantitative. The urokinase containing solution thus obtained is purified into a preparation suitable for medicinal purposes.

The invented method is an excellent one since the specific activity of urokinase in an impure solution can be raised from approximately 100 units per mg of protein to approximately 5,000 units per mg of protein with essentially a quantitative yield. Thus the high degree of specificity of urokinase absorption by uric acid is demonstrated.

The following is a description of the present invention with an example of its execution. This will make the present invention more clearly understandable, but the invention is not limited to the cited example.

EXAMPLE I

One hundred ml of human urine (100 units per mg protein) was admixed with 250 mg of uric acid; the mixture was stirred at room temperature for 30 minutes. The uric acid containing the adsorbed urokinase was collected by centrifugation. The adsorbed urine was devoid of activity. The precipitate was washed with distilled water to remove salts and protein. The uric acid was suspended in 10 ml of 0.5M tris-HCl buffer at pH 7.5; the mixture was placed in a dialysis bag and dialyzed at 4° against 150 ml of 0.5M tris-HCl buffer at pH 7.5; solid tris was added to maintain the pH between 7-8.5.

After all the uric acid had dissolved and the contents of the dialysis bag were clear, the solution inside the dialysis bag was assayed for urokinase activity. The solution showed 5,000 units of urokinase per mg of protein. This represented a 50 fold increase in specific activity with essentially a quantitative yield of urokinase.

I claim:

1. A method for purifying and concentrating urokinase from a solution by adsorbing said urokinase onto a suspension of uric acid and then recovering the urokinase from the adsorbent.

2. A method according to claim 1 in which the urokinase is recovered from the adsorbent (uric acid) by dialyzing the suspension of uric acid containing the adsorbed urokinase against a weakly alkaline solution.

3. A method according to claim 2 in which the uric acid dissolves in the weakly alkaline solution and dialyzes into the dialyzing medium thus liberating the urokinase in solution.

4. A method according to claim 3 in which the soluble urokinase liberated upon dialysis from the uric acid is recovered in the dialysis bag as the impermeate.

* * * * *